United States Patent [19]

Peters

[11] Patent Number: 4,979,809
[45] Date of Patent: * Dec. 25, 1990

[54] AIR SCOOP MIRROR ASSEMBLY

[76] Inventor: Melvin G. Peters, 8563 SE. Flavel Dr., Portland, Oreg. 97206

[ * ] Notice: The portion of the term of this patent subsequent to Nov. 25, 2004 has been disclaimed.

[21] Appl. No.: 632,659

[22] Filed: Jul. 20, 1984

[51] Int. Cl.$^5$ .......................... G02B 5/08; G02B 7/18; B60R 1/06; B60S 1/02
[52] U.S. Cl. .................................................. 350/584
[58] Field of Search ............... 350/584, 582; D12/187

[56] References Cited

U.S. PATENT DOCUMENTS

| | | | |
|---|---|---|---|
| 2,796,506 | 6/1967 | Lumbert | 350/584 |
| 3,059,540 | 10/1962 | Robinson | 350/584 |
| 3,667,369 | 6/1972 | Smith | 350/584 |
| 4,248,497 | 2/1981 | Leighton | 350/584 |
| 4,550,988 | 11/1985 | Harder et al. | 350/584 |
| 4,580,881 | 4/1986 | Kim | 350/584 |

FOREIGN PATENT DOCUMENTS

| | | | |
|---|---|---|---|
| 8030528 | 12/1981 | Fed. Rep. of Germany | 350/584 |
| 44054 | 3/1980 | Japan | 350/584 |
| 1020576 | 2/1966 | United Kingdom | 350/584 |

*Primary Examiner*—Jon W. Henry

[57] ABSTRACT

An air scoop for use in conjunction with an external mirror on a vehicle for eliminating water droplets on the reflecting surface of the mirror by funneling a flow of air over the top of the mirror and down over the face thereof. The air scoop includes a top plate mounted above the top of the mirror, and a downwardly curving deflector formed at the rearward edge of the top plate to direct the flow of air over the surface of the mirror when the vehicle is in forward motion. The air blows the water spray off of the mirror for improved visibility.

11 Claims, 1 Drawing Sheet

AIR SCOOP MIRROR ASSEMBLY

BACKGROUND OF THE INVENTION

This invention relates to rear view mirrors for a vehicle, and in particular to a device for directing an air flow over the surface of an external rear view mirror in order to blow away droplets of spray which form on the mirror when driving in rainy weather.

Often when driving a vehicle in the rain, water droplets from spray tend to form on the reflective surface of external mirrors. This severely affects visibility. Particularly on trucks, which kick up a considerable amount of spray, and which have air currents which sometimes do not immediately conduct the spray away from the vehicle, this fogging can be severe. Further, a trucker relies solely on his external mirrors for rearward visibility.

In the past, the only solution readily available to solve the problem of water droplets on the mirrors was to manually wipe the mirrors from time to time. In a large truck, it is impossible for the driver alone to wipe the passenger side mirror when driving.

It is known, for use on a van or station wagon, to provide a deflector adjacent the rear of the vehicle for improving the air flow over the rear end of the vehicle. However, the difference between this application and using the air scoop of the present invention for rear view mirrors is that in the case of the rear view mirror, both the front and back sides of the mirror are in the air stream. Thus the flowing air impinging on the front side of the mirror creates pressure which can drive the air, when funneled properly, to flow over the rearwardly reflecting surface of the mirror.

A recent Japanese patent discloses a device to eliminate water droplets on the mirror of a passenger car. In this device, a compressor blows air through a nozzle onto the surface of a mirror, which blows the water droplets off the mirror. Of course, considerable expense and mechanical complexity is inherent in the compressor system. This prior invention fails to take advantage of the naturally occuring air flows when driving.

Accordingly, it is the general object of the present invention to provide an air scoop for an external rear view mirror which will direct a flow of air downwardly over the face of the mirror when the vehicle is in forward motion.

Another object is to provide an air scoop in which the entire front surface of the mirror is used to increase the air flow directed down the reflective surface of the mirror.

Another object is to provide an air scoop which captivates the air at the sides of the mirror.

Yet another object is to provide a unitary assembly with the mirror inside of an enclosure or housing.

A further object is to provide an efficient apparatus for funneling and directing the air over the surface of the mirror by orienting the side walls forwardly in the direction of travel of the vehicle, while blowing air uniformly over the surface of the mirror which is slanted with respect to the direction of travel of the vehicle.

A still further object is to provide an embodiment of the invention which may be easily retrofitted to existing rear view mirrors on vehicles.

These and other objects and advantages of the present invention and the manner in which they are achieved will be made apparent as the specification and claims proceed.

SUMMARY OF THE INVENTION

In its general concept, the present invention is an air scoop for use in conjunction with an external mirror on a vehicle for eliminating water droplets, fog or spray, or for preventing the formation thereof, on the rearwardly reflecting surface of the mirror. The air scoop includes a top plate mounted above the mirror and spaced therefrom to allow a flow of air between the plate and the top of the mirror when the vehicle is in forward motion, and a downwardly curving deflector formed as an extension of the top plate, at the rear thereof, curving around the top of the mirror at at a distance spaced from the mirror to direct a flow of air downwardly over the face of the mirror, thereby blowing droplets of water on the reflective surface downwardly and off of the mirror.

DESCRIPTION OF THE PREFERRED EMBODIMENTS

Figure 1:
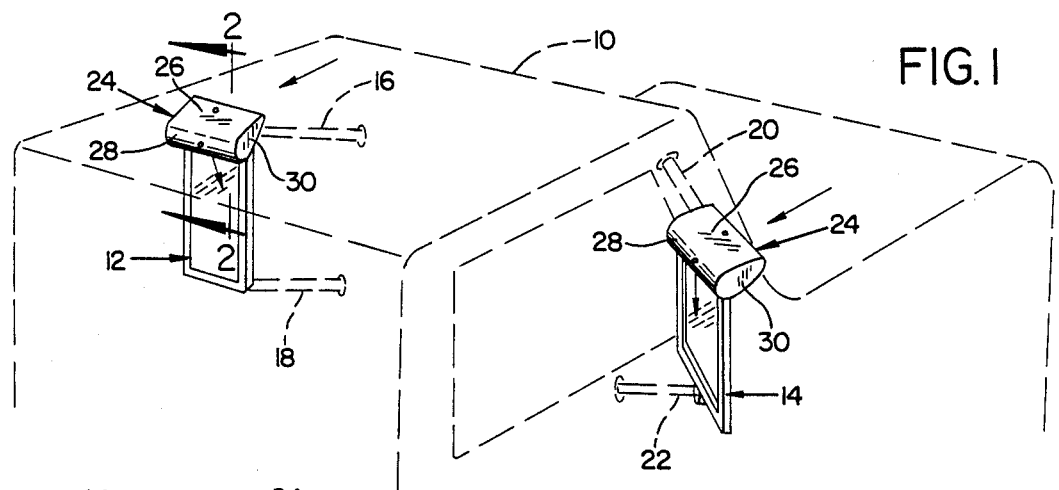
FIG. 1 is a top perspective view of a vehicle, shown in phantom line, and illustrating the first embodiment of the present invention.

As shown in FIG. 1, a truck 10, which is representative of any vehicle, mounts exterior rear view mirrors 12 and 14 on the right and left sides thereof respectively. As is common practice, mirror 12 is mounted by frame members 16 and 18, and mirror 14 is mounted by frame members 20 and 22.

Figure 2:
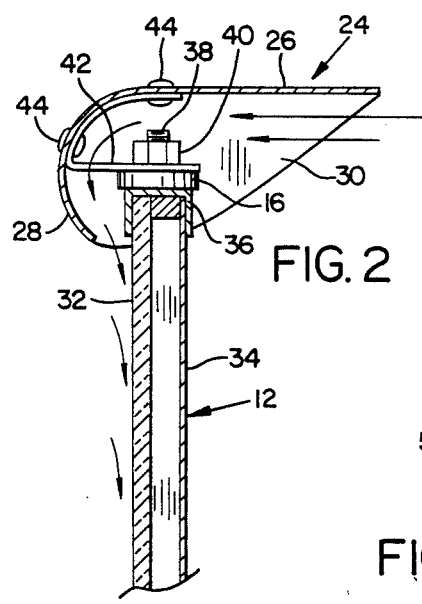
FIG. 2 is a fragmentary section taken along the line 2—2 of FIG. 1.

The first embodiment of the invention is shown generally at 24. FIG. 2 best illustrates the construction of the air scoop. A top plate 26 is mounted above the mirror and is spaced therefrom to allow a flow of air between the top plate and the top edge of the mirror. Of course, it is only when the vehicle is traveling in forward motion that there is any air movement. A downwardly curving deflector 28 is formed as an extension of the top plate. It continues from the rearward end of the top plate in a semicircular bend around the top of the mirror. The distance between the deflector and the top of the mirror is substantially constant. In order to efficiently direct as much air as possible over the surface of the mirror, the deflector is curved approximately 90° or perhaps slightly more from horizontal. This causes the air to impinge on the top of the mirror and then flow down over its surface.

Figure 6:
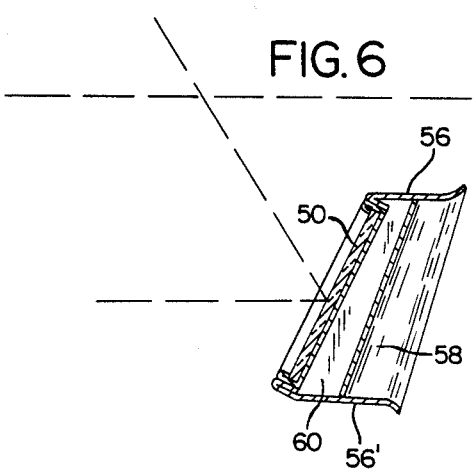
FIG. 6 is a horizontal section looking in the direction of line 6—6 of FIG. 5.

Side walls 30 are provided on both side ends of the top plate and form substantially vertical planes adjacent the sides of the mirror. This directs the air toward the downwardly curving deflector rather than letting it escape at the sides. Preferably, side walls 30 are directed forwardly in the direction of travel of the vehicle so that they will not block air flow into the air scoop. This involves flaring them inwardly approximately the same amount as the mirror is rotated, as is best illustrated in FIG. 6. The slant of the mirror angle may vary from driver to driver, but not significantly enough to affect performance of the air scoop. However, there is substantial difference in angle between the right side mirror and the left side mirror.

The flow of air is illustrated in the drawings by arrows. Air impinges on glass surface 32 of the mirror and sweeps downwardly over the rearwardly facing or reflecting surface. Any droplets of water from rain, fog or spray are blown by the air off the bottom of the mirror. This includes any moisture which may be in the air flow. Of course, the device may remain attached during times of no rain with no effect.

Mirror 12 is representative of a truck mirror in common use. It includes a forwardly facing backing 34 which is sandwiched with glass 32 by a channel 36 around the edge of the mirror. The channel protects the edges of the mirror. To this channel a stud 38 is mounted and extends from the top center position thereof on the vertical axis of the mirror. This mounts the mirror on frame member 16 which extends into the air scoop at an angle, avoiding side wall 30. A nut 40 secures the mounting assembly. A similar arrangement is found at the bottom of the mirror (not shown) mounting the mirror on frame member 18.

A bracket 42 is mounted on stud 38 and is also secured by nut 40. The bracket mounts top plate 26 and deflector 28 by rivets 44. Thus, the even spacing is solidly maintained around the top of the mirror to facilitate air flow. Further, bracket 42 is substantially thin or narrow so as to minimize disruption of the air flow.

The mirror is pivoted on its vertical axis, by rotating it about its top and bottom mounting studs, and is angled to produce the proper reflective angle from behind the vehicle to the inside thereof. Thus, the deflector is preferably positioned so that it conforms to the angle of the reflective surface of the mirror, and is evenly spaced from the top of the mirror across the width thereof. This produces an even flow of air over the surface of the mirror. This angle is best shown in FIG. 6, with the line of sight denoted by a dashed line.

Figure 3:
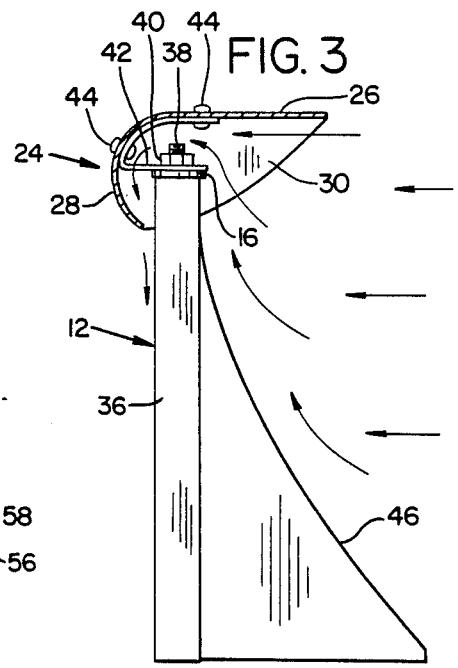
FIG. 3 is a side view similar to FIG. 2, illustrating a second embodiment of the invention.

FIG. 3 illustrates the second embodiment of the present invention, which is substantially the same as the air scoop of the first embodiment, but includes an upwardly curving ramp 46 mounted in front of mirror 12 to direct air upwardly and toward the top plate 26. By this structure the entire front surface of the mirror is used for collecting air to flow downwardly over the reflecting surface of the mirror. This is possible because the mirror back is normally positioned in the full air flow by the side of the vehicle. However, even the flat forward side of the mirror builds up pressure which promotes air flow around the deflector. This embodiment merely serves to illustrate that the pressure of an air flow can be confined and directed. Compared to prior art mirrors, an otherwise aerodynamic obstruction is turned to beneficial use.

Figure 4:
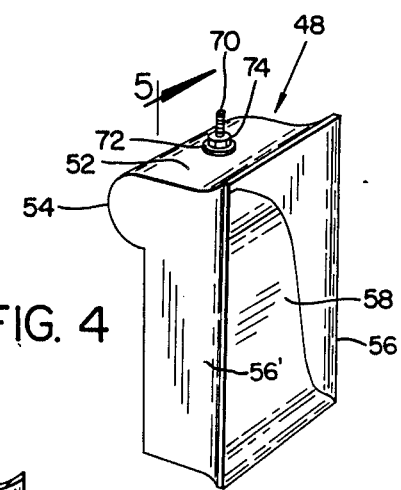
FIG. 4 is a top perspective view of an integral air scoop assembly, which is the third embodiment of the present invention.
Figure 5:
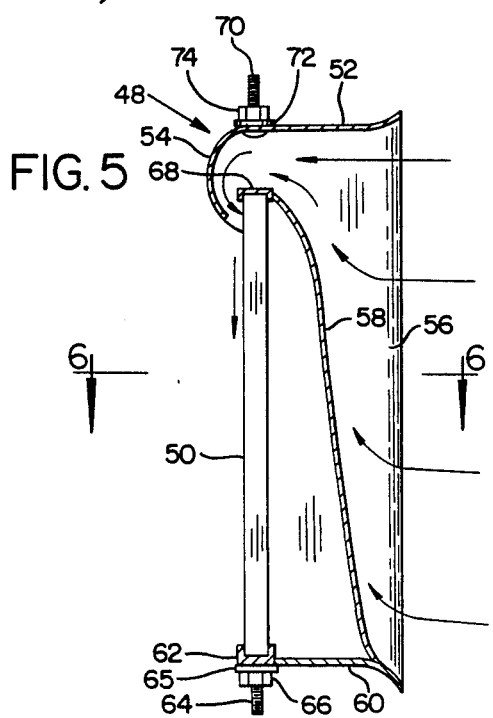
FIG. 5 is a vertical section taken along the line 5—5 of FIG. 4.

While the foregoing embodiments disclose devices which may readily be retrofit to commonly used truck mirrors, FIGS. 4, 5 and 6 illustrate an integral air scoop and mirror assembly, as the third embodiment of the present invention. This structure is intended more as a replacement assembly, or to be used in the initial manufacture of a vehicle.

The mirror assembly is denoted generally at 48, and includes a mirror 50 mounted therein. A top plate 52 extends over the top of the mirror and curves into a deflector 54. Side walls 56 and 56' extend forwardly along the sides of the mirror and mount top plate 52. The side plates also extend toward and engage the side edges of the deflector, forming a rounded funnel as best shown in FIG. 4.

Between side plates 56 and 56' is mounted an upwardly curving ramp 58 which directs the air upwardly and toward the top plate. This ramp has the same intended function as ramp 46 in FIG. 3.

A bottom plate 60 is mounted between the bottom edges of side walls 56 and 56' and extends forwardly to the bottom of ramp 58. The bottom merely forms a closed assembly.

Preferably, the forward edges of side walls 56 and 56' and top plate 52 and bottom plate 60 are belled outwardly at their forward edges to present a more aerodynamically efficient air scoop. Similarly, top plate 26 and side plates 30 of the first embodiment may be belled outwardly at their forward edges if desired.

A channel laps the edges of mirror 50. The channel extends around the full perimeter of the mirror to protect its edges and position the mirror. Bottom channel 62 mounts bottom plate 60 at its forward edge. The upper end of the assembly includes upper channel 68 which overlaps the top edge of mirror 50 and to which the top end of ramp 58 connects.

To the bottom channel 62 is attached a mounting means, including a stud 64 extending downwardly from the channel at the bottom of the mirror. A washer 65 and a nut 66 engage the stud and secure the assembly. A top stud 70 is located in top plate 52 vertically above the mirror, along the vertical axis thereof. A washer 72 and a nut 74 secure the stud in place. This leaves the space between top channel 68 and top plate 52 completely open.

Studs 64 and 70 mount the entire assembly onto the frame members which are attached to a vehicle, such as frame members 16, 18, 20 and 22 of FIG. 1. The position of the studs is at the vertical axis of the mirror, and the assembly may be rotated about the axis to adjust the reflecting angle.

The present invention provides an efficient and useful apparatus for eliminating water droplets on external mirrors of vehicles. Natural, or preexisting air flows are harnessed. Visibility is greatly improved, and thus safety is enhanced.

Various modifications and changes obvious to those skilled in the art may be made to the invention without departing from its intended spirit and scope.

I claim:

1. An air scoop mirror assembly forming an external mirror for a vehicle and for eliminating water droplets, fog or spray, or for preventing the formation thereof, on the rearwardly reflecting surface of the mirror, the assembly being mounted on the outside of a vehicle by a frame means attached to the vehicle for supporting the mirror assembly, the assembly comprising:
   (a) a mirror having a rearwardly reflecting surface;
   (b) an enclosure which surrounds the mirror, leaving the reflective surface thereof exposed, comprising:
      (1) a channel lapping the edges of the mirror;
      (2) side walls extending forwardly from the sides of the channel;
      (3) a top plate mounted on the side walls above and extending forwardly from the mirror and being spaced therefrom to allow a flow of air between the top plate and the top of the mirror when the vehicle is in forward motion; and (4) a downwardly curving deflector formed at the rearward edge of the top plate, and curving around the top of the mirror at a distance spaced therefrom, to direct the air downwardly over the reflecting surface of the mirror; and (c) mounting means extending upwardly from the top plate substantially on the vertical axis of the mirror, and another extending downwardly from the channel at the bottom of the mirror substantially on the vertical axis of the mirror, and each engaging the frame means for supporting the assembly.

2. The assembly of claim 1 wherein the side walls extend to and engage the side edges of the deflector.

3. The assembly of claim 1 further comprising an upwardly curving ramp mounted between the side walls in front of the mirror to direct air upwardly and toward the top plate.

4. The assembly of claim 3 further comprising a bottom plate extending from the channel at the bottom of the mirror forwardly to the bottom of the ramp.

5. The assembley of claim 1 wherein the transition between the top plate and the deflector includes a bend of 90° or more from horizontal.

6. The assembly of claim 1 wherein the side walls are belled outwardly at their forward edges.

7. The assembly of claim 1 wherein the top plate is belled upwardly at its forward edge.

8. An air scoop for use in conjunction with an external mirror on a vehicle, for eliminating water droplets, fog or spray, or for preventing the formation thereof, on the rearwardly reflecting surface of the mirror, the air scoop comprising:

(a) a substantially horizontal, forwardly extending top plate mounted in relation to the mirror above the mirror and spaced therefrom to allow a flow of air between the top plate and the top of the mirror when the vehicle is in forward motion;

(b) a downwardly curving deflector formed at the rearward edge of the top plate, and curving around the top of the mirror at a distance spaced therefrom, to direct the air downwardly over the reflecting surface of the mirror; and (c) mounting means attached to the vehicle for mounting the top plate in said relation to the mirror, wherein the mirror has a top mounting bolt at the top center thereof, the mounting means comprising a mounting bracket attached to the bolt and extending to the top plate, transversing the air space between the top of the mirror and the top plate, the bracket being substantially narrow to minimize disruption of the air flow.

9. An air scoop for use in conjunction with an external mirror on a vehicle, for eliminating water droplets, fog or spray, or for preventing the formation thereof, on the rearwardly reflecting surface of the mirror, the air scoop comprising:

(a) a substantially horizontal, forwardly extending top plate mounted in relation to the mirror above the mirror and spaced therefrom to allow a flow of air between the top plate and the top of the mirror when the vehicle is in forward motion;

(b) a downwardly curving deflector formed at the rearward edge of the top plate, and curving around the top of the mirror at a distance spaced therefrom, to direct the air downwardly over the reflecting surface of the mirror;

(c) mounting means attached to the vehicle for mounting the top plate in said relation to the mirror; and (d) an upwardly concavely curving ramp mounted in front of the mirror to direct air upwardly and toward the top plate, the ramp covering substantially the entire front surface of the mirror.

10. An air scoop for use in conjunction with an external mirror on a vehicle, for eliminating water droplets, fog or spray, or for preventing the formation thereof, on the rearwardly reflecting surface of the mirror, the air scoop comprising:

(a) a substantially horizontal, forwardly extending top plate mounted in relation to the mirror above the mirror and spaced therefrom to allow a flow of air between the top plate and the top of the mirror when the vehicle is in forward motion, the top plate being belled upwardly at its forward edge;

(b) a downwardly curving deflector formed at the rearward edge of the top plate, and curving around the top of the mirror at a distance spaced therefrom, to direct the air downwardly over the reflecting surface of the mirror; and (c) mounting means attached to the vehicle for mounting the top plate in said relation to the mirror.

11. An air scoop for use in conjunction with an external mirror on a vehicle, for eliminating water droplets, fog or spray, or for preventing the formation thereof, on the rearwardly reflecting surface of the mirror, the air scoop comprising:

(a) a substantially horizontal, forwardly extending top plate mounted in relation to the mirror above the mirror and spaced therefrom to allow a flow of air between the top plate and top of the mirror when the vehicle is in forward motion;

(b) a downwardly curving deflector formed at the rearward edge of the top plate, and curving around the top of the mirror at a distance spaced therefrom, to direct the air downwardly over the reflecting surface of the mirror;

(c) mounting means attached to the vehicle for mounting the top plate in said relation to the mirror; and (d) side walls mounted on both side ends of the top plate and deflector, and forming substantially vertical planes adjacent the sides of the mirror for confining the air from sideways escape and directing it toward the deflector, the side walls being configured to extend directly forwardly substantially in the direction of the forward travel of the vehicle, the side walls being belled outwardly at their forward edges.

* * * * *